(12) United States Patent
Torres et al.

(10) Patent No.: US 7,788,273 B2
(45) Date of Patent: Aug. 31, 2010

(54) USER INTERFACE FOR FACETED EXPLORATION

(75) Inventors: Robert J. Torres, Colleyville, TX (US);
James R. Rudd, Charlotte, NC (US)

(73) Assignee: International Business Machines Corporation, Armonk, NY (US)

( * ) Notice: Subject to any disclaimer, the term of this patent is extended or adjusted under 35 U.S.C. 154(b) by 455 days.

(21) Appl. No.: 11/567,246

(22) Filed: Dec. 6, 2006

(65) Prior Publication Data
US 2008/0140617 A1 Jun. 12, 2008

(51) Int. Cl.
*G06F 17/30* (2006.01)
(52) U.S. Cl. ........................ 707/758; 715/764
(58) Field of Classification Search .................. 707/758
See application file for complete search history.

(56) References Cited

U.S. PATENT DOCUMENTS

| | | | |
|---|---|---|---|
| 5,680,619 A * | 10/1997 | Gudmundson et al. ...... 717/108 |
| 5,966,126 A * | 10/1999 | Szabo .......................... 715/762 |
| 6,012,051 A | 1/2000 | Sammon, Jr. et al. |
| 6,711,577 B1 | 3/2004 | Wong et al. |
| 6,826,553 B1* | 11/2004 | DaCosta et al. ................ 707/1 |
| 6,847,964 B2* | 1/2005 | Hayduk, Jr. .................... 707/5 |
| 6,952,693 B2 | 10/2005 | Wolff et al. |
| 7,035,864 B1* | 4/2006 | Ferrari et al. ............... 707/102 |
| 7,062,483 B2* | 6/2006 | Ferrari et al. .................. 707/3 |
| 2001/0037359 A1 | 11/2001 | Mockett et al. |
| 2002/0029259 A1 | 3/2002 | Okada |
| 2002/0042750 A1 | 4/2002 | Morrison |
| 2003/0009467 A1 | 1/2003 | Perrizo |
| 2003/0067489 A1 | 4/2003 | Wong et al. |
| 2004/0122674 A1 | 6/2004 | Bangalore et al. |
| 2005/0044043 A1 | 2/2005 | Gooding et al. |
| 2005/0192953 A1 | 9/2005 | Neale et al. |
| 2006/0053104 A1* | 3/2006 | Ferrari et al. .................. 707/3 |
| 2006/0150118 A1 | 7/2006 | Chaudhri et al. |
| 2006/0168536 A1 | 7/2006 | Portmann |
| 2006/0294071 A1* | 12/2006 | Weare et al. ................... 707/3 |
| 2007/0219960 A1* | 9/2007 | Vadon et al. ................... 707/3 |
| 2008/0005118 A1 | 1/2008 | Shakib et al. |
| 2008/0086451 A1* | 4/2008 | Torres et al. ................... 707/3 |

OTHER PUBLICATIONS

USPTO Office action for U.S. Appl. No. 11/539,086 dated Feb. 26, 2010.
USPTO office action for U.S. Appl. No. 11/539,086 dated Jun. 25, 2009.
USPTO office action for U.S. Appl. No. 11/539,086 dated Jan. 9, 2009.

* cited by examiner

*Primary Examiner*—Pierre M Vital
*Assistant Examiner*—Romney J Hogaboam
(74) *Attorney, Agent, or Firm*—Yee & Associates, P.C.; William H. Steinberg; Rudolf O. Siegesmund

(57) ABSTRACT

The extended facet navigator combines two or more facet navigators for searching two or more datasets into a single, space efficient user interface. Each facet navigator is comprised of a plurality of constraint manipulators surrounding a results viewer. In one embodiment, the results from a first facet navigator are a constraint for a second facet navigator. Whenever the results of a first facet navigator are a constraint for a second facet navigator, any change to a constraint manipulator on the first facet navigator will update the results for the first facet navigator. The updated results from the first facet navigator updates the constraint on the second facet navigator. The second facet navigator updates the results of the second facet navigator based on the updated constraint.

15 Claims, 9 Drawing Sheets

USER INTERFACE FOR FACETED EXPLORATION

CROSS-REFERENCE TO RELATED APPLICATION

The present invention is related to the subject matter of U.S. patent application Ser. No. 11/539,086, incorporated herein by reference.

FIELD OF THE INVENTION

The present invention relates generally to database access, and relates specifically to an operator interface for setting database search constraints.

BACKGROUND OF THE INVENTION

Application discloses a facet navigator for searching a database where a plurality of constraint manipulators surround a view field, creating a spider shaped user interface controller. FIG. 1 shows facet navigator 100 for searching a dataset of laptop computers. Manipulator field 110 has a plurality of constraint manipulators related to different constraints a user might consider when choosing to buy a laptop computer. As a user adjusts a constraint manipulator, view field 140 changes to display search results 142 of the dataset matching the search criteria set by the constraint. For example, manipulator 171 for cost constraint 111 is a slider on a slider bar that a user can adjust to search for computers within a selected price range. In this example, search results 142 are displayed in a sorted array with price axis 144 and quality axis 146. Other constraint manipulators shown are slider 172 for weight constraint 112, slider 173 for battery constraint 113, slider 174 for display constraint 114, slider 175 for communication constraint 115, slider 176 for brand constraint 116, slider 177 for "what I want to do" constraint 117, slider 178 for disk constraint 118, slider 179 for memory constraint 119, slider 180 for speed constraint 120, slider 181 for software constraint 121, and slider 182 for operating system constraint 122. Facet navigator 100 is a space efficient user interface for searching a single database by setting a plurality of constraints. Facet navigator 100 does not allow the individual to conduct related searches of multiple databases simultaneously.

Many computerized tasks involve searching multiple databases, then combining the individual results to form a final result. For example, when an individual relocates to a new city, the individual will consider multiple factors in choosing a place to live. Factors the individual may consider include cities, schools, neighborhoods, and lifestyle. Information for each of these factors may be stored in different databases. The individual must search each database separately, then combine the information to achieve a final result. A need exists for a way to combine a plurality of facet navigators for related searches of different databases into a single, space efficient user interface.

SUMMARY OF THE INVENTION

The extended facet navigator combines two or more facet navigators for searching two or more databases into a single, space efficient user interface. The extended facet navigator displays a first facet navigator comprising a first view field surrounded by a first manipulator field, wherein the first manipulator field comprises a plurality of graphical constraint manipulators representing fields in a first database. The extended facet navigator displays a second facet navigator comprising a second view field surrounded by a second manipulator field, wherein the second manipulator field comprises a plurality of graphical constraint manipulators representing fields in a second database. Responsive to a user setting a first constraint for a facet in the first database with one of the graphical constraint manipulators in the first manipulator field, the extended facet navigator searches the first database based on the first constraint, and displays in the first view field the search results from the first database that satisfy the first constraint.

In an additional embodiment, the results from the first facet navigator become a constraint for the second facet navigator. In a further embodiment, the results from the second facet navigator become a constraint for a third facet navigator. In yet another embodiment, the results from the first facet navigator become a first constraint for the third facet navigator, and the results from the second facet navigator become a second constraint for the third facet navigator. In a further embodiment, a facet navigator can be "minimized" so that the user interface appears less cluttered. In another further embodiment, the results from a conventional database search becomes a constraint for a facet navigator.

BRIEF DESCRIPTION OF DRAWINGS

The novel features believed characteristic of the invention are set forth in the appended claims. The invention itself, however, as well as a preferred mode of use, further objectives and advantages thereof, will be understood best by reference to the following detailed description of an illustrative embodiment when read in conjunction with the accompanying drawings, wherein:

DETAILED DESCRIPTION OF THE PREFERRED EMBODIMENT

The principles of the present invention are applicable to a variety of computer hardware and software configurations. The term "computer hardware" or "hardware," as used herein, refers to any machine or apparatus that is capable of accepting, performing logic operations on, storing, or displaying data, and includes without limitation processors and memory. The term "computer software" or "software," refers to any set of instructions operable to cause computer hardware to perform an operation. A "computer," as that term is used herein, includes without limitation any useful combination of hardware and software, and a "computer program" or "program" includes without limitation any software operable to cause computer hardware to accept, perform logic operations on, store, or display data. A computer program may, and often is, comprised of a plurality of smaller programming units, including without limitation subroutines, modules, functions, methods, and procedures. Thus, the functions of the present invention may be distributed among a plurality of computers and computer programs. The invention is described best, though, as a single computer program that configures and enables one or more general-purpose computers to implement the novel aspects of the invention. For illustrative purposes, the inventive computer program will be referred to as the "Extended Facet Navigator".

Figure 1:
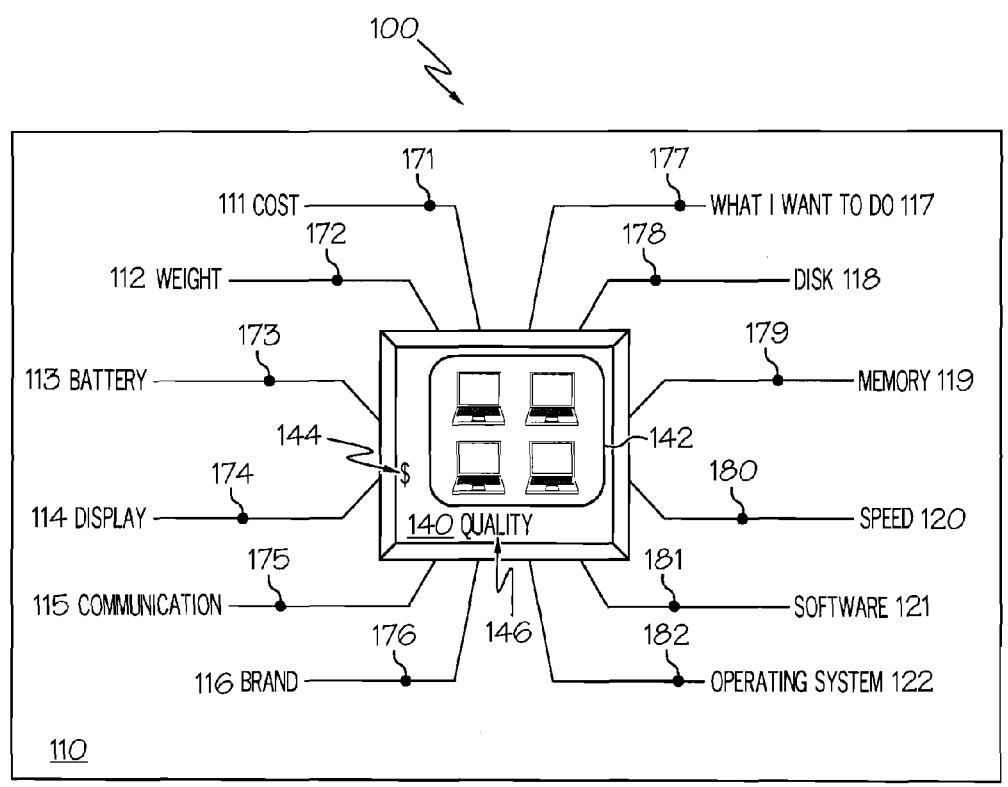
FIG. 1 illustrates a single prior art facet navigator.
Figure 2:
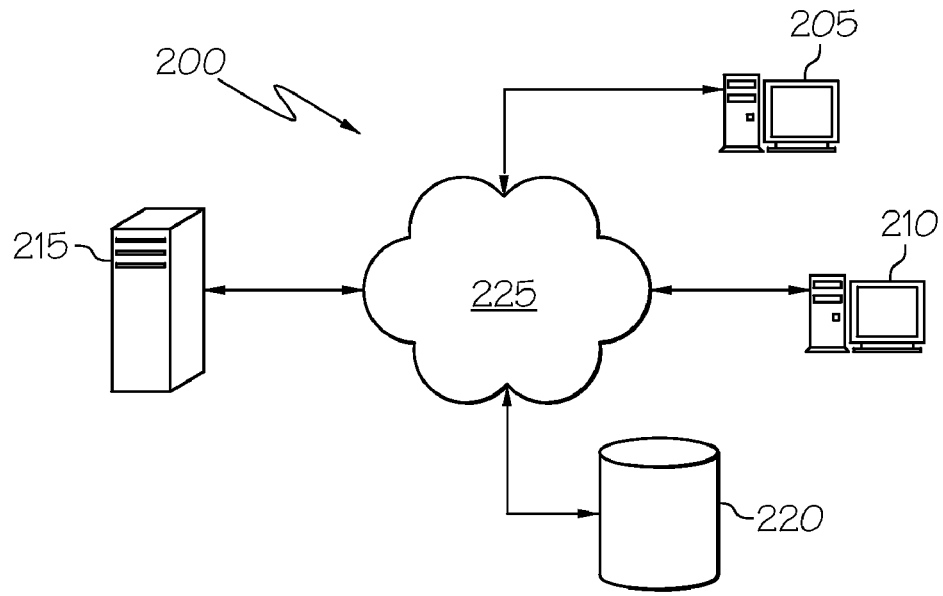
FIG. 2 is an exemplary computer network.

Additionally, the Extended Facet Navigator is described below with reference to an exemplary network of hardware devices, as depicted in FIG. 2. A "network" comprises any number of hardware devices coupled to and in communication with each other through a communications medium, such as the Internet. A "communications medium" includes without limitation any physical, optical, electromagnetic, or other medium through which hardware or software can transmit data. For descriptive purposes, exemplary network 200 has only a limited number of nodes, including workstation computer 205, workstation computer 210, server computer 215, and persistent storage 220. Network connection 225 comprises all hardware, software, and communications media necessary to enable communication between network nodes 205-220. Unless otherwise indicated in context below, all network nodes use publicly available protocols or messaging services to communicate with each other through network connection 225.

Figure 3:
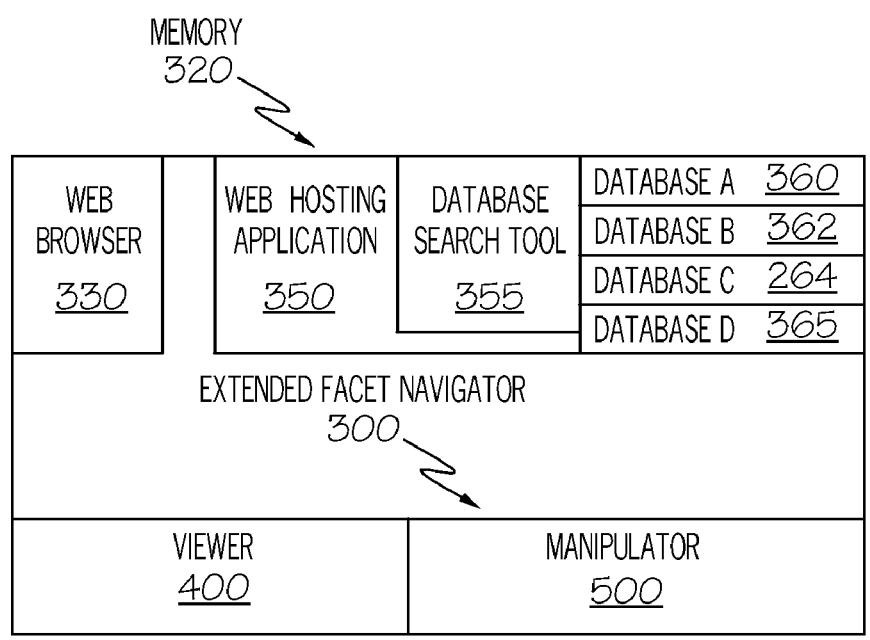
FIG. 3 describes files and programs in a memory on a computer.

Extended Facet Navigator 300 typically is stored in a memory, represented schematically as memory 320 in FIG. 3. The term "memory," as used herein, includes without limitation any volatile or persistent medium, such as an electrical circuit, magnetic disk, or optical disk, in which a computer can store data or software for any duration. A single memory may encompass and be distributed across a plurality of media. Further, Extended Facet Navigator 300 may reside in more than one memory distributed across different computers, servers, logical partitions, or other hardware devices. The elements depicted in memory 320 may be located in or distributed across separate memories in any combination, and Extended Facet Navigator 300 may be adapted to identify, locate and access any of the elements and coordinate actions, if any, by the distributed elements. Thus, FIG. 3 is included merely as a descriptive expedient and does not necessarily reflect any particular physical embodiment of memory 320. As depicted in FIG. 3, though, memory 320 may include additional data and programs. Of particular importance to Extended Facet Navigator 300, memory 320 may include web browser 330, web hosting application 350, database search tool 355, database A 360, database B 362, database C 364, and database D 365 with which Extended Facet Navigator 300 interacts. Extended Facet Navigator 300 has two components, viewer 400 and manipulator 500. Extended Facet Navigator 300 is shown here as interfacing with web-based database search tool 355, hosted by web hosting application 350, and accessed by web browser 330. Extended Facet Navigator 300 can be adapted to work with any computerized environment for searching databases.

Figure 4:
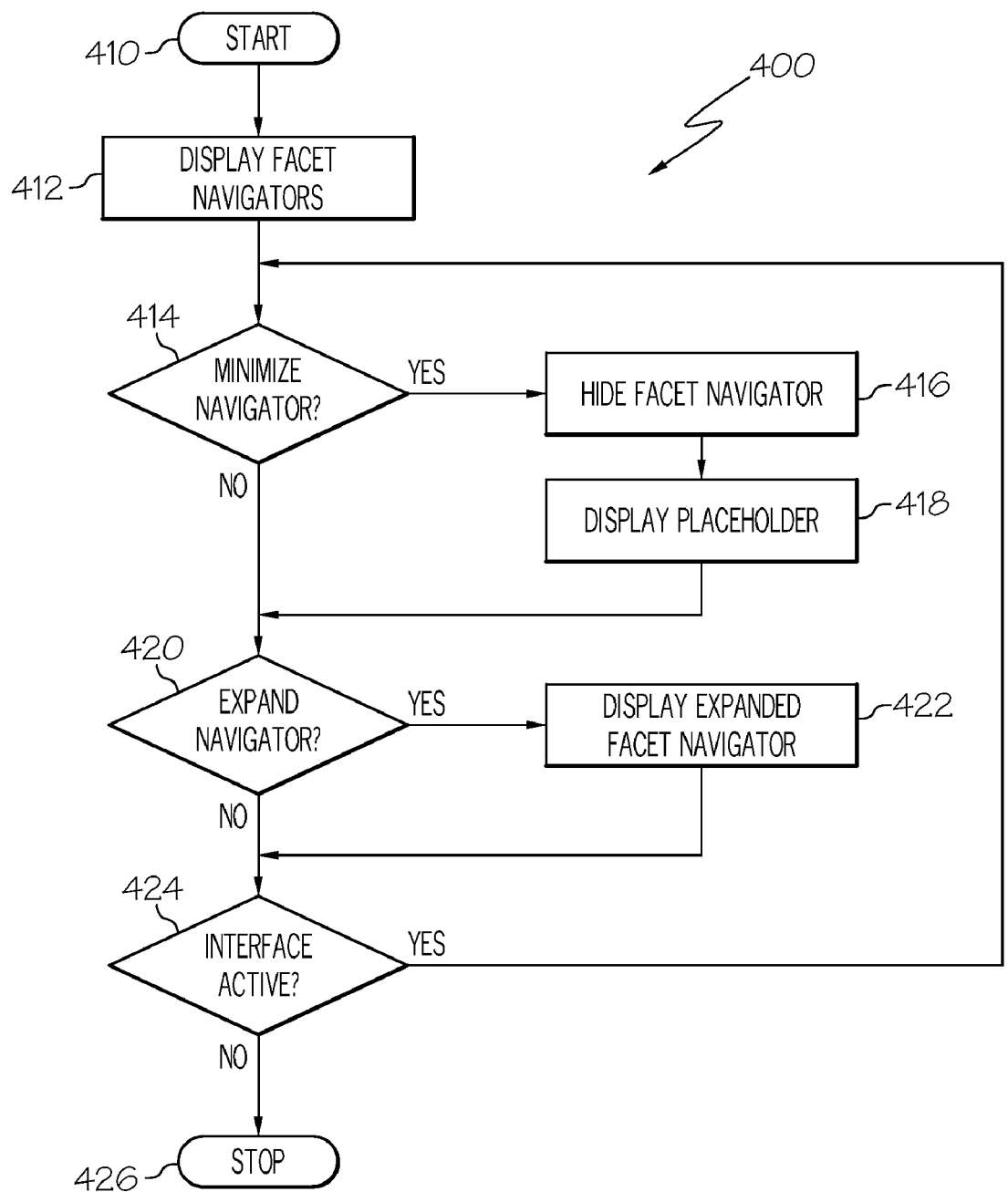
FIG. 4 is a flow chart of a viewer component.

FIG. 4 depicts viewer 400. Viewer 400 starts whenever a user accesses database search tool 355 with Extended Facet Navigator 300 (410). Viewer 400 displays two or more facet navigators (412), each facet navigator adapted to search a different database, such as database A 360, database B 362, database C 364, and database D 365. Each facet navigator comprises a plurality of constraint manipulators that correspond with fields in a database, and a results viewer which shows database search results related to selected constraints. A user may want to minimize a facet navigator to reduce clutter on the display. For example, a user may click on a radio button, or chose "minimize" from a pop-up menu to minimize a facet navigator. If a user wants to minimize a facet navigator (414), viewer 400 hides the minimized facet navigator (416) and displays a place holder (418). The placeholder may be a label for the minimized facet navigator, or may be a miniaturized results viewer without constraint manipulators. The miniaturized results viewer may display a subset of the results from that last search. A user may want to expand a minimized facet navigator to view the minimized facet navigator or conduct a search. For example, a user may click on a radio button, or chose "expand" from a pop-up menu to expand a facet navigator. If a user wants to expand a facet navigator (420), viewer 400 displays the expanded facet navigator (422). As long as Expanded Facet Navigator 300 is active (424), viewer 400 can repeat steps 414-422 in response to the user. When Expanded Facet Navigator 300 is no longer active, viewer 400 stops (426).

Figure 5:
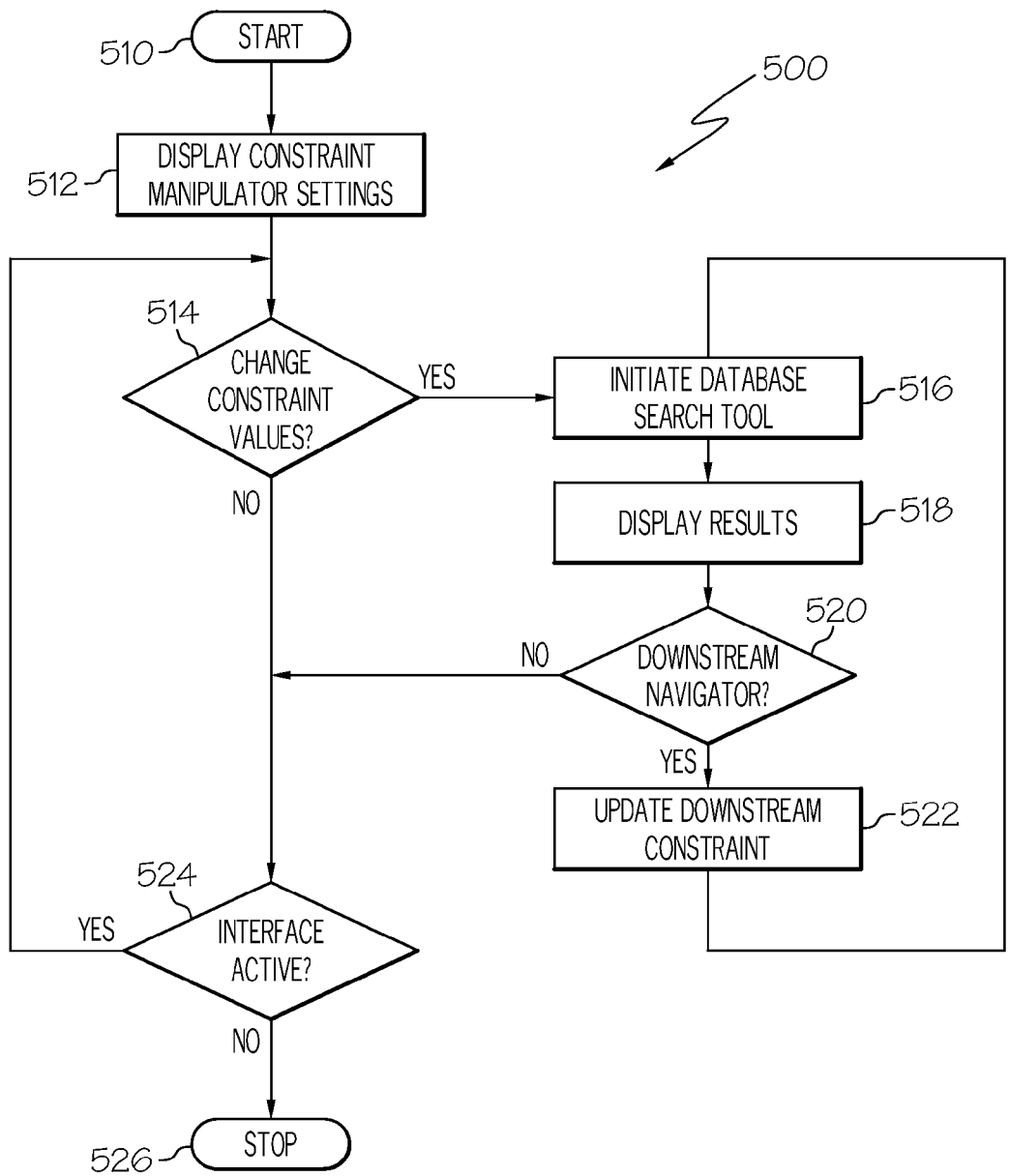
FIG. 5 is a flow chart of a manipulator component.

FIG. 5 depicts manipulator 500. Manipulator 500 starts whenever a user accesses database search tool 355 with Extended Facet Navigator 300 (510). Manipulator displays current constraint manipulator settings in every expanded facet navigator (512). A user may change a constraint value, by adjusting a constraint manipulator on a facet navigator. If a user changes a constraint value (514) on a first facet navigator associated with database A 360, manipulator 400 initiates database search tool 355 to search database A 360 (516) and displays the search results in the results viewer (518) of first facet navigator. If a second facet navigator uses the results of first facet as a constraint, the second facet navigator is a "downstream facet navigator." . Manipulator 500 determines if there is a downstream facet navigator (520). If manipulator 500 determines there is a downstream facet navigator, manipulator updates the constraint on the downstream facet navigator (522) and goes to step 516 to propagate the results to the downstream facet navigator. If there are no downstream facet navigators, or after results are propagated to all downstream facet navigators, manipulator goes to step 524. As long as Expanded Facet Navigator 300 is active (524), manipulator 500 repeats steps 514-522 in response to the user changing constraint values. When Expanded Facet Navigator 300 is no longer active, manipulator 500 stops (526).

Figure 6:
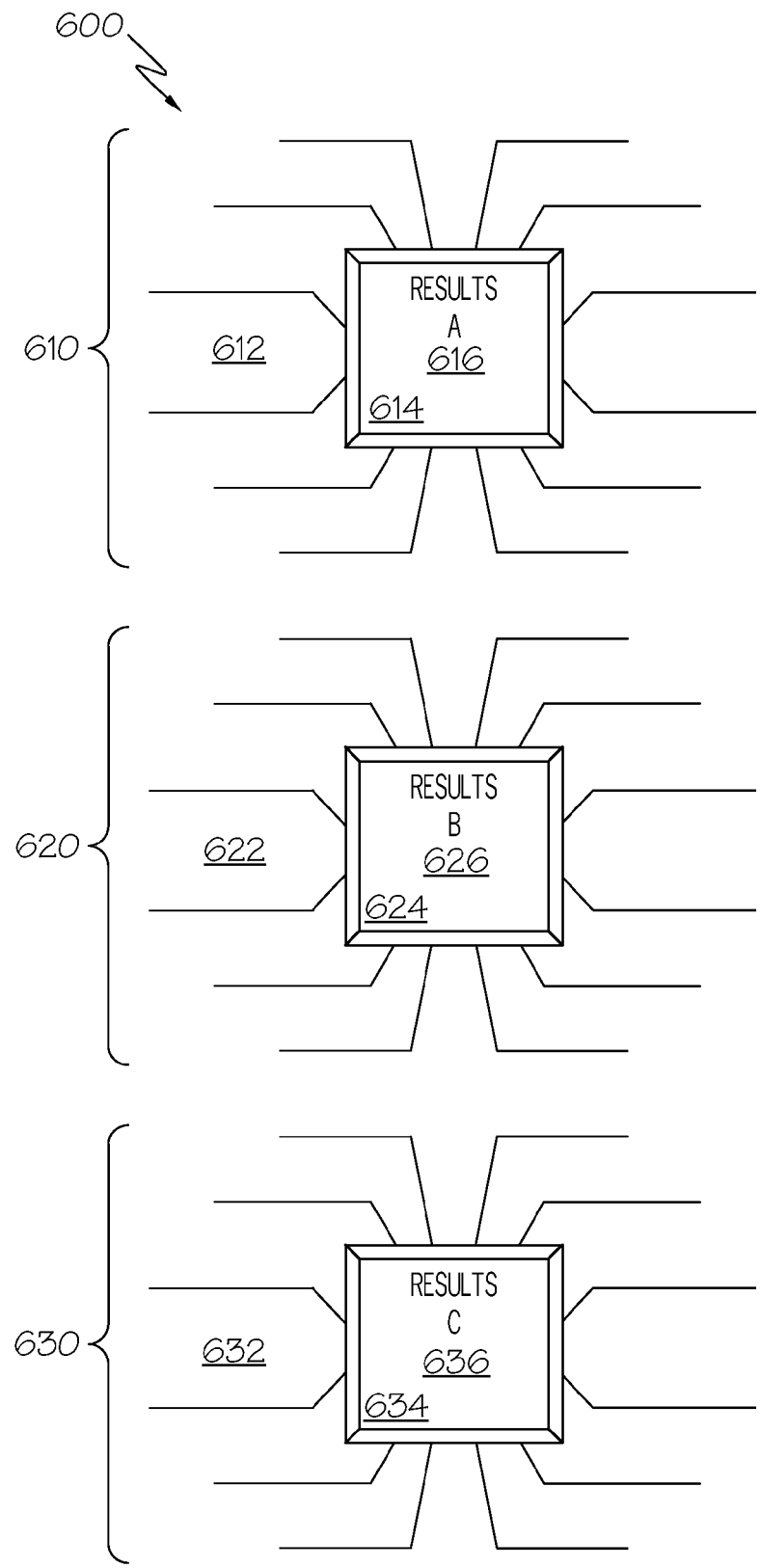
FIG. 6 illustrates an extended facet navigator.

FIG. 6 illustrates three facet navigators on user interface 600. First facet navigator 610 is related to database A 360 and comprises constraint manipulator field 612 and view field 614. Results A 616 are displayed in view field 614, showing the results of a search of database A 360 in responses to a user setting at least one of a plurality of constraint manipulators in manipulator field 612. Second facet navigator 610 is related to database B 362 and comprises constraint manipulator field 622 and view field 624. Results B 626 are displayed in view field 624, showing the results of a search of database B 362 in responses to a user setting at least one of a plurality of constraint manipulators in manipulator field 622. Third facet navigator 630 is related to database C 364 and comprises constraint manipulator field 632 and view field 634. Results C 636 are displayed in view field 634, showing the results of a search of database C 364 in responses to a user setting at least one of a plurality of constraint manipulators in manipulator field 632.

Figure 7A:
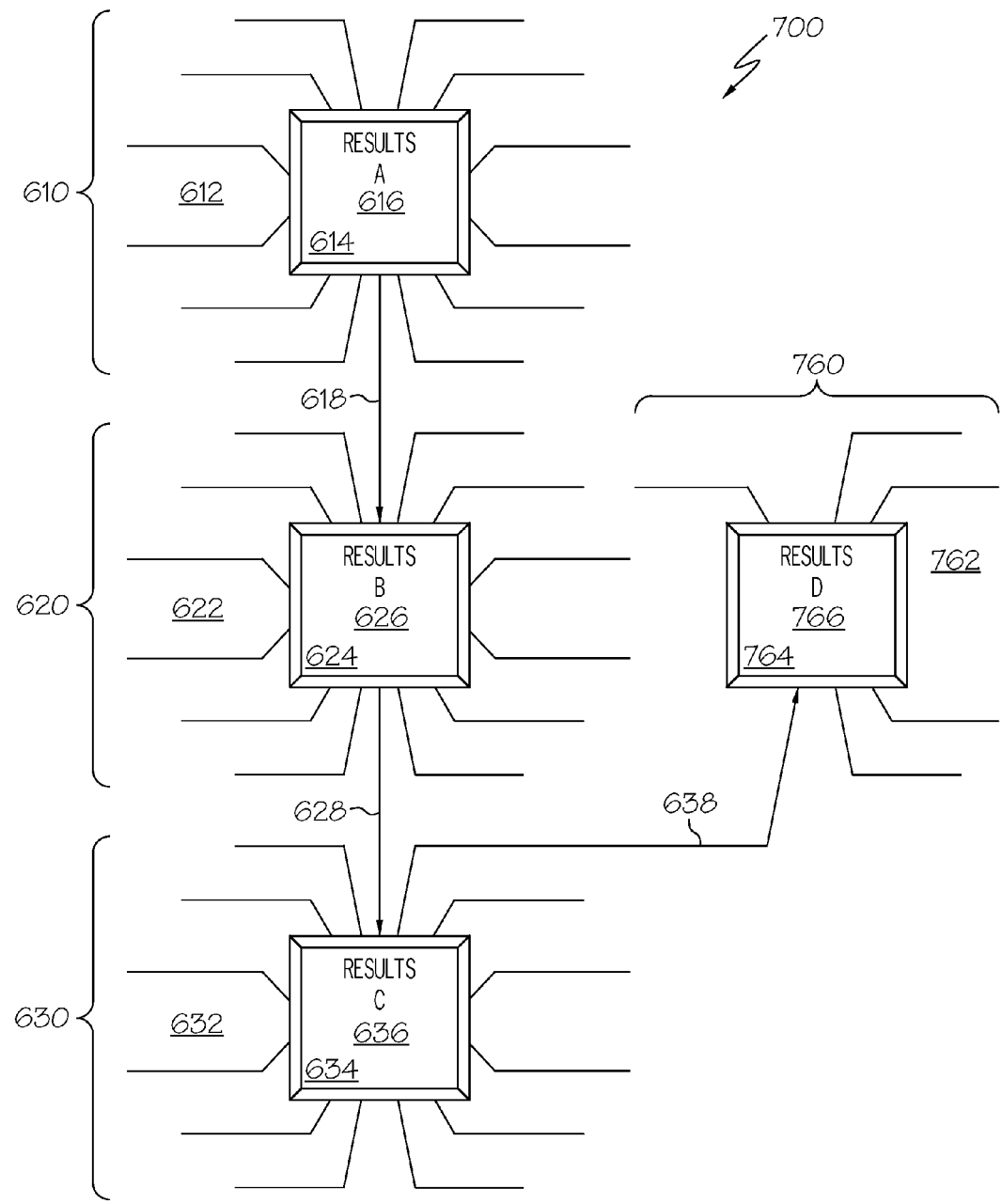
FIG. 7A illustrates an extended facet navigator.

FIG. 7A illustrates an embodiment of Extended Facet Navigator 300 on user interface 700, where results of a facet navigator are a constraint for a subsequent facet navigator in sequence. Results A 616 in view field 614 of first facet navigator 610 is a constraint for second facet navigator 620 as shown by arrow 618. A change to a facet manipulator in facet manipulator field 612 will cause a change to results A 616. A change in results A 616 or a change to a facet manipulator in facet manipulator field 622 will cause a change to results B 626 in view field 624. Results B 626 of second facet navigator 620 is a constraint for third facet navigator 630 as shown by arrow 628. A change in results B 626 or a change to a facet manipulator in facet manipulator field 632 will cause a change to results C 636 in view field 634. Results C 636 of third facet navigator 630 is a constraint for fourth facet navigator 760 as shown by arrow 638. (Fourth facet navigator 760 is related to database D 638.) A change in results C 636 or a change to a facet manipulator in facet manipulator field 762 will cause a change to results D 766 in view field 764. Because the results of facet navigators 610, 620, and 630 are constraints of the subsequent facet navigators 620, 630, and 760 respectively, a change to a constraint in constraint manipulator filed 612 of facet navigator 620 changes the results of facet navigators 620, 630 and 760.

Figure 7B:
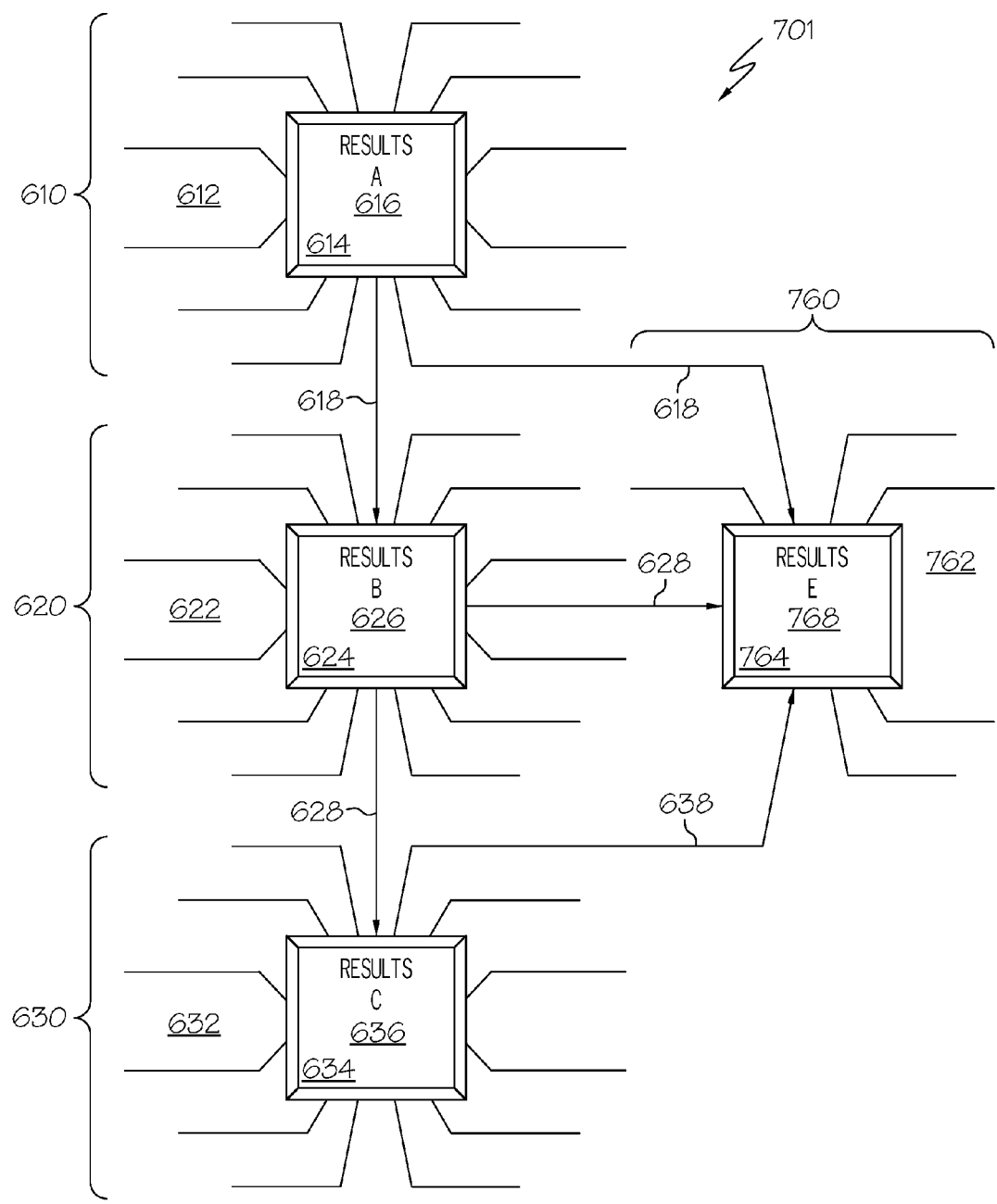
FIG. 7B illustrates an extended facet navigator.

FIG. 7B illustrates an embodiment of Extended Facet Navigator 300 on user interface 701, where the search results from more than one facet navigators are a set of constraints for a final facet navigator. Results A 616 in view field 614 of first facet navigator 610 is a constraint for fourth facet navigator 760 as shown by arrow 618. A change to a facet manipulator in facet manipulator field 612 will cause a change to results A 616. A change in results A 616 or a change to a facet manipulator in facet manipulator field 762 will cause a change to results E 768 in view field 764. Results B 626 in view field 624 of second facet navigator 620 is a constraint for fourth facet navigator 760 as shown by arrow 628. A change in results B 626 or a change to a facet manipulator in facet manipulator field 762 will cause a change to results E 768. Results C 636 in view field 634 of third facet navigator 630 is a constraint for fourth facet navigator 760 as shown by arrow 638. A change in results C 636 or a change to a facet manipulator in facet manipulator field 762 will cause a change to results E 768.

Figure 8:
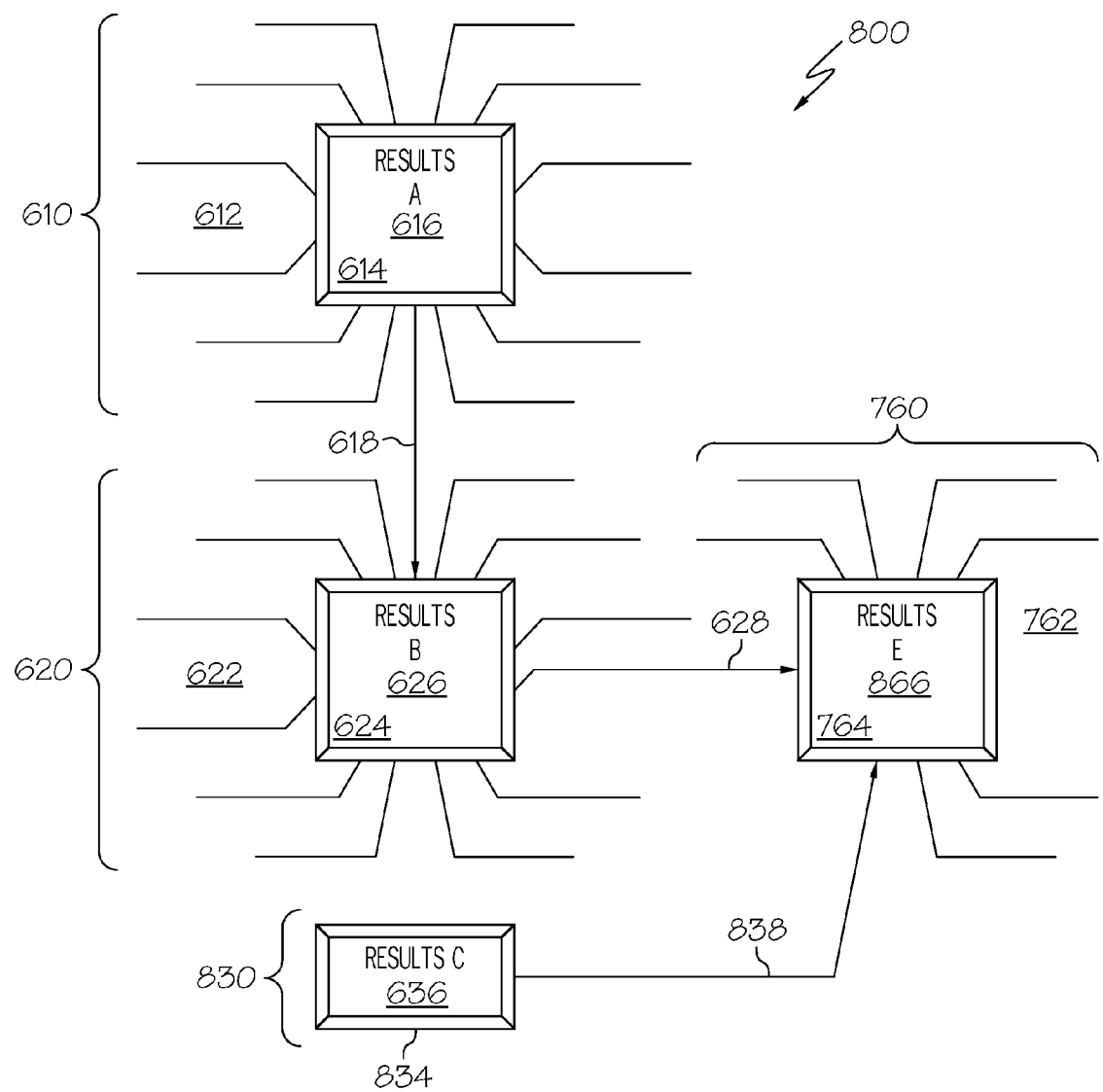
FIG. 8 illustrates a feature of an extended facet navigator.

FIG. 8 illustrates a combination of features of Extended Facet Navigator 300 on user interface 800. Results A 616 in view field 614 of first facet navigator 610 is a constraint for second facet navigator 620 as shown by arrow 618. A change to a facet manipulator in facet manipulator field 612 will cause a change to results A 616. A change in results A 616 or a change to a facet manipulator in facet manipulator field 622 will cause a change to results B 626. Results B 626 in view field 624 of second facet navigator 620 is a constraint for fourth facet navigator 760 as shown by arrow 628. A change in results B 626 or a change to a facet manipulator in facet manipulator field 662 will cause a change to results E 866 in view field 764. Results C 636 is shown by placeholder 834 in minimized third facet navigator 830. Results C 636 in placeholder 834 of minimized third facet navigator 830 is a constraint for fourth facet navigator 760 as shown by arrow 838. Minimized facet navigator 830 makes user interface 800 appear less cluttered.

Figure 9:
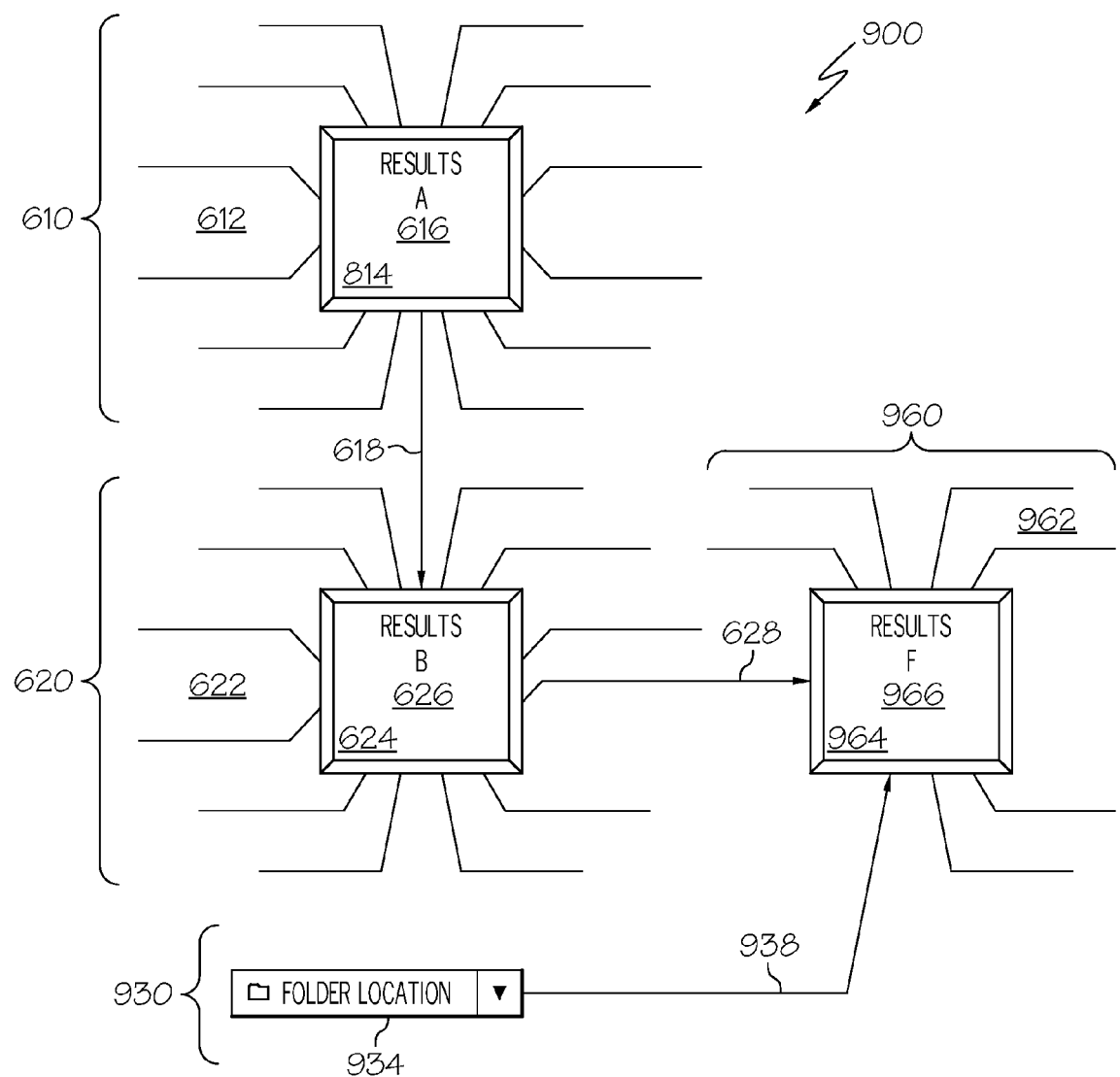
FIG. 9 illustrates an extended facet navigator with a conventional dataset search tool.

FIG. 9 illustrates another feature of Extended Facet Navigator 300 on user interface 900. Results A 616 in view field 614 of first facet navigator 610 is a constraint for second facet navigator 620 as shown by arrow 618. A change to a facet manipulator in facet manipulator field 612 will cause a change to results A 616. A change in results A 616 or a change to a facet manipulator in facet manipulator field 622 will cause a change to results B 626. Results B 626 in view field 624 of second facet navigator 620 is a constraint for fourth facet navigator 660 as shown by arrow 628. A change in results B 626 or a change to a facet manipulator in facet manipulator field 962 will cause a change to results F 966 in view field 964. Extended Facet Navigator 300 can be adapted to integrate with conventional database search tools. Conventional database search tool 930 associated with database C 366 is represented by drop down menu 934. Results of conventional database search tool 930 is a constraint for fourth facet navigator 960 as shown by arrow 938. A change in results from conventional database search tool 930 or a change to a facet manipulator in facet manipulator field 962 will cause a change to results F 966. As with minimized third facet navigator 830 in FIG. 8, conventional database search tool 930 can be minimized to reduce clutter on a user interface.

A preferred form of the invention has been shown in the drawings and described above, but variations in the preferred form will be apparent to those skilled in the art. Specifically, more complicated combinations of facet navigators and conventional database search tools can be arranged in the same user interface, wherein results of searches are used as constraints for subsequent facet navigators, and wherein facet navigators and conventional database search tools can be minimized to reduce clutter on the user interface. The preceding description is for illustration purposes only, and the invention should not be construed as limited to the specific form shown and described. The scope of the invention should be limited only by the language of the following claims.

What is claimed is:

1. A computer implemented method for searching more than one internet database by facet, the computer implemented process comprising:

displaying at least two or more facet navigators, wherein a first facet navigator from the at least two or more facet navigators comprises a first view field surrounded by a first manipulator field, wherein the first manipulator field comprises a plurality of graphical constraint manipulators representing fields in a first database;

displaying a second facet navigator from the at least two or more facet navigators, wherein the second facet navigator comprises a second view field surrounded by a second manipulator field, wherein the second manipulator field comprises a plurality of graphical constraint manipulators representing fields in a second database, wherein a total number of the facet navigators used for the searching of the more than one internet database by facet corresponds to the total number of separate databases used in the internet search;

setting a first constraint from a plurality of constraints for a facet in the first database with one of the graphical constraint manipulators in the first manipulator field, wherein the graphical constraint manipulators are a set of slider bars, wherein the set of slider bars are adjustable by the user to set the constraints for facets in a database;

searching the first database based on the first constraint from the plurality of constraints;

displaying in the first view field the search results from the first database that satisfy the first constraint;

using the search results from the first database as a second constraint for searching the second database;

searching the second database based on the second constraint;

displaying in the second view field the search results from the second database that satisfy the second constraint; and repeating for any additional downstream facet navigators, wherein the any additional downstream facet navigators comprise facet navigators that use prior search results as constraints for separate databases corresponding to the any additional downstream facet navigators.

2. The computer implemented method of claim 1, wherein a facet navigator is adapted to interface with web-based database searching tools.

3. The computer implemented method of claim 1 further comprising:
responsive to a minimize command, displaying a placeholder in place of the facet navigator.

4. The computer implemented method of claim 3 wherein the placeholder displays a subset of the results in a view field of the facet navigator.

5. The computer implemented method of claim 3 wherein the placeholder displays a description related to the facet navigator.

6. An apparatus for searching more than one internet database by facet, the apparatus comprising:
a processor;
a memory connected to the processor;
a first database file, a second database file, and a third database file in the memory;
a web hosting application running in the memory operable to be accessed by a web browser, wherein the web hosting application is further operable to search and display items in a set of databases; and
an extended facet navigator program in the memory operable to:
display at least two or more facet navigators, wherein a first facet navigator from the at least two or more facet navigators comprises a first view field surrounded by a first manipulator field, wherein the first manipulator field comprises a plurality of graphical constraint manipulators representing fields in a first database;
display a second facet navigator from the at least two or more facet navigators, wherein the second facet navigator comprises a second view field surrounded by a second manipulator field, wherein the second manipulator field comprises a plurality of graphical constraint manipulators representing fields in a second database, wherein a total number of the facet navigators used for the searching of the more than one internet database by facet corresponds to the total number of separate databases used in the internet search internet search;
set a first constraint from a plurality of constraints for a facet in the first database with one of the graphical constraint manipulators in the first manipulator field, wherein the graphical constraint manipulators are a set of slider bars, wherein the set of slider bars are adjustable by the user to set the constraints for facets in a database;
search the first database based on the first constraint from the plurality of constraints;
display in the first view field the search results from the first database that satisfy the first constraint;
use the search results from the first database as a second constraint for searching the second database;
search the second database based on the second constraint;
display in the second view field the search results from the second database that satisfy the second constraint; and
repeat for any additional downstream facet navigators, wherein the any additional downstream facet navigators comprise facet navigators that use prior search results as constraints for separate databases corresponding to the any additional downstream facet navigators.

7. The apparatus of claim 6 wherein the extended facet navigator program is further adapted to interface with web-based database searching tools.

8. The apparatus of claim 6 further comprising:
responsive to a minimize command, to display a placeholder in place of a facet navigator.

9. The apparatus of claim 8 wherein the placeholder displays a subset of the results in a view field of the facet navigator.

10. The apparatus of claim 8 wherein the placeholder displays a description related to the facet navigator.

11. A computer program product stored on a recordable type computer usable medium for searching more than one internet database by facet, the computer program product comprising:
computer usable program code for displaying at least two or more facet navigators, wherein a first facet navigator from the at least two or more facet navigators, comprises a first view field surrounded by a first manipulator field, wherein the first manipulator field comprises a plurality of graphical constraint manipulators representing fields in a first database;
computer usable program code for displaying a second facet navigator from the at least two or more facet navigators, wherein the second facet navigator comprises a second view field surrounded by a second manipulator field, wherein the second manipulator field comprises a plurality of graphical constraint manipulators representing fields in a second database, wherein a total number of the facet navigators used for the searching of the more than one internet database by facet corresponds to the total number of separate databases used in the internet search;
computer usable program code for setting a first constraint from a plurality of constraints for a facet in the first database with one of the graphical constraint manipulators in the first manipulator field, wherein the graphical constraint manipulators are a set of slider bars, wherein the set of slider bars are adjustable by the user to set the constraints for facets in a database;
computer usable program code for searching the first database based on the first constraint from the plurality of constraints;
computer usable program code for displaying in the first view field the search results from the first database that satisfy the first constraint;
computer usable program code for using the search results from the first database as a second constraint for searching the second database;
computer usable program code for searching the second database based on the second constraint;
computer usable program code for displaying in the second view field the search results from the second database that satisfy the second constraint; and
computer usable program code for repeating for any additional downstream facet navigators, wherein the any additional downstream facet navigators comprise facet navigators that use prior search results as constraints for separate databases corresponding to the any additional downstream facet navigators.

12. The computer program product of claim 11, wherein a facet navigator is adapted to interface with web-based database searching tools.

13. The computer program product of claim 11 further comprising an instruction that responsive to a minimize command, displays a placeholder in place of the facet navigator.

14. The computer program product of claim 13 wherein the placeholder displays a subset of the results in a view field of the facet navigator.

15. The computer program product of claim 13 wherein the placeholder displays a description related to the facet navigator.

* * * * *